C. L. CUMMINGS.
UNIVERSAL JOINT.
APPLICATION FILED APR. 14, 1909.
950,094.
Patented Feb. 22, 1910.
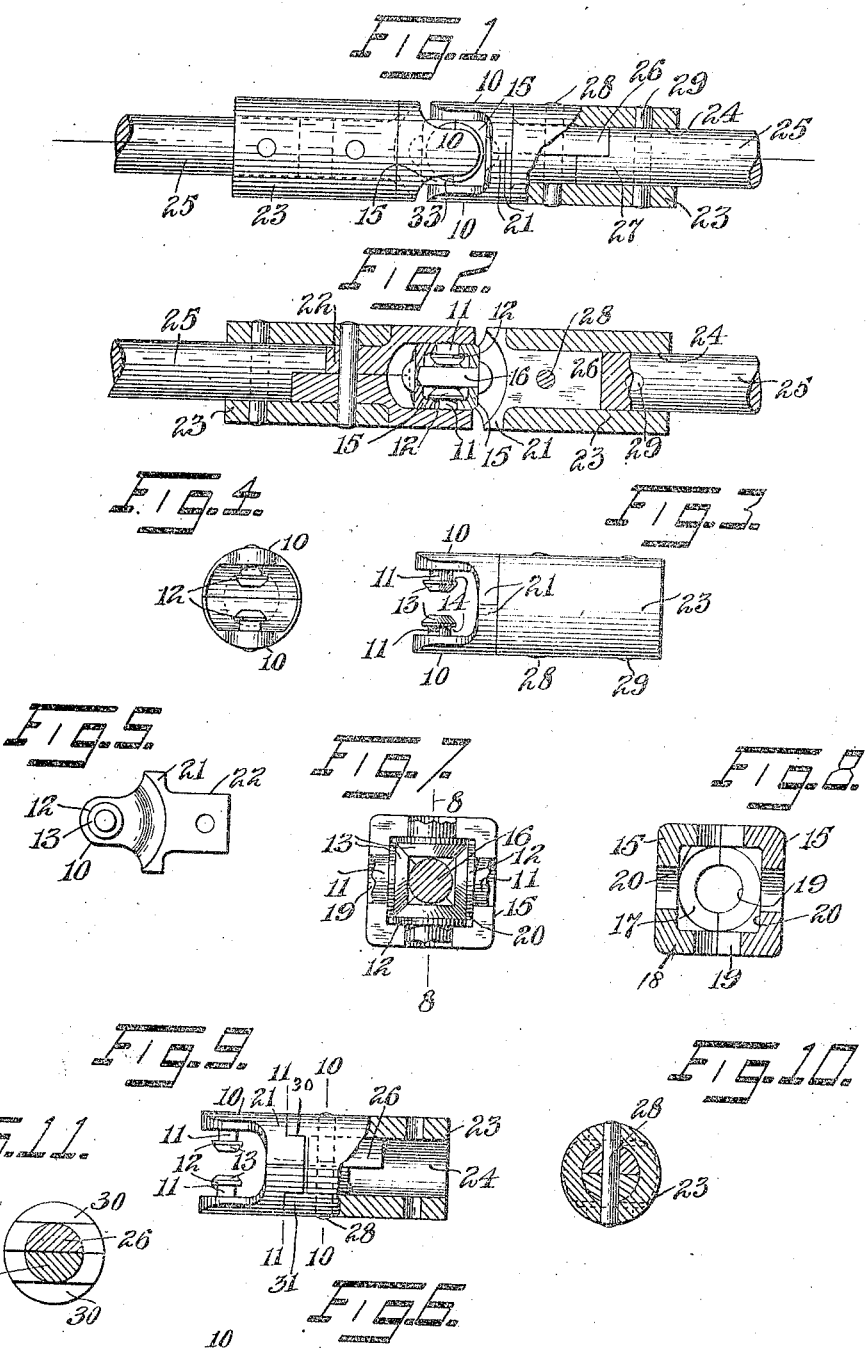
Witnesses:
Inventor:
Charles L. Cummings,
By his Attorney,

UNITED STATES PATENT OFFICE.

CHARLES L. CUMMINGS, OF NEW YORK, N. Y.

UNIVERSAL JOINT.

950,094.

Specification of Letters Patent. Patented Feb. 22, 1910.

Application filed April 14, 1909. Serial No. 489,767.

*To all whom it may concern:*

Be it known that I, CHARLES L. CUMMINGS, a citizen of the United States, residing in New York, in the county of New York and State of New York, have invented certain new and useful Improvements in Universal Joints, of which the following is a specification.

This invention relates to universal joints and has for its object a reduction of the number of parts and the strengthening of the structure by providing means integral with the arms of the bifurcated shaft ends for engaging the connecting block and resisting the tendency of such arms when under load to spread apart, and it also embodies conical faces carried by the arms for inter-engagement, these faces being held in driving engagement by the connecting block.

Certain novel features pertaining to the general construction and organization of the joint which make for its general efficiency and commercial adaptability, will be more fully described in the proper portion of the description and referred to in the claims.

In the drawings accompanying and forming a part of this specification Figure 1 is an elevational view, partly shown in longitudinal section, of a practical embodiment of a form of my invention. Fig. 2 is a view at about right angles to that shown in Fig. 1, more of the parts being shown in longitudinal section. Fig. 3 is a side view of one side or portion of the joint disconnected from the connecting block. Fig. 4 is an end view of the portion illustrated in Fig. 3, looking at this from the left hand end. Fig. 5 is an illustration of one of the arms shown disconnected from the holding devices therefor. Fig. 6 is a side view of arms integrally connected, the arms, shank, pins and head being in one piece. Fig. 7 is an illustration of the four conical driving members broken away from their carrying arms, and one member, or half, of the connecting block; in this view the connecting pin or rivet, is shown in cross section. Fig. 8 is a cross sectional view through the entire block made up of both members, and is taken at about the plane of the line 8—8 of Fig. 7. Fig. 9 illustrates the manner in which the arms may be securely held in position in the connecting member, and Figs. 10 and 11 are sections of Fig. 9 at about the planes indicated by the lines 10—10 and 11—11 respectively thereon.

One of the difficulties experienced in the practical use of universal joints is that the arms 10, which, in certain aspects of the device may be regarded as bifurcations of the shafts which are to be connected, have a tendency when the shaft is under load to spread apart. The means which have been resorted to for holding these arms together have been screws and rivets and various devices made separately from and then attached to the arms. The objection to this manner of construction is that these parts have to be so small in commercial forms of the device that they are weak, making the holes to carry these parts weaken other parts, and generally the construction is such that after a short amount of hard usage they become loose and finally destroy the construction. In my device each of the arms 10 will be provided with a pin 11, which pin will bear a head 12, the pins project toward each other and the heads are carried upon the inward ends of the pins and present conical faces 13 and a square shoulder 14 at the rear or outer end.

The faces 13 constitute the driving faces, that is, the faces of the pins upon one shaft are in rolling driving interengagement with the faces of the pins upon the other shaft, and such faces are held in driving engagement by means of a connecting block shown as comprising two members 15—15, which are held together by some suitable connecting device, as for instance a rivet 16.

In Fig. 7 the broken away pins and the heads are illustrated in position in one of the connecting block members. Each block member will be chambered out. The chamber is shown at 17 in Fig. 8. From this chamber will extend outwardly through the walls 18 which surround such chamber, semi-cylindrical recesses or bearing portions 19 which will receive the pins 11 and hold the faces 13 in driving engagement, all the heads 12 being seated in the said chamber. The rear or outward faces 14 of the pins will engage the faces 20 of the walls of the chamber and prevent or restrain the tendency of the arms to move outwardly when the coupling or joint is under load.

As before stated, the heads, pins and arms, are shown as made integral. In Fig. 5 and some of the other figures, each arm is shown as made in a single structure, and which arms are provided with a boss or shoulder portion 21, and shank or tang portions 22, 26 for seating in a sleeve or holder 23. In Fig. 6 the arms and shanks are shown as made in one integral structure. The holder is shown as socketed at its end at 24 for receiving the end of the shaft 25, which is to be coupled to another and similar shaft, or whatever devices it may be desired in practice to connect up. In the present instance one of the arm shanks as 26 is shown as made longer than is the other arm 22, and this is for the purpose of engaging a similarly formed end 27 of the shaft. The arms are shown as connected together and to the coupling by means of a pin 28, and the shaft is shown as connected with the socket of the sleeve or connector 23 by means of a pin 29. In practice these will be such as are found most convenient for use in the connection in which employed; they may be whatever the trade may demand.

In Figs. 9 and 10 an additional means of securement is illustrated, which will remove considerable of the strain, if not the entire strain, from the pins 28 and 29. In this instance the shoulder portion 21 is made longer than in the other illustration, and this is slabbed off at such side, as at 30, and mating ends 31 are provided on the sleeves or connector 23 for engaging the slabbed off faces. This furnishes a very strong and satisfactory connection.

It will be seen, particularly by reference to Fig. 7 that when one shaft has power applied to it and load is applied to the other shaft that the faces 13 which are in driving engagement will cause one shaft to rotate the other and the connecting block will hold such faces in engagement and will, when the load becomes excessive, restrain the tendency of the arms 10 to spread apart.

By reference to Fig. 8 and to the division line 33 in Fig. 1 it will be seen that the parts 15—15, which make a connecting block, connect on a plane transverse to the general axis of the shafts 25 when these are in axial alinement, and by this means all the pins 11 are in bearings in each of the members of the connecting block, so that there are two integral members connecting these pins together.

This universal joint is one which it is practicable to make commercially, and the parts may be readily assembled.

Having thus described my invention, I claim:

1. The combination with two shafts each provided with a pair of arms, pins carried by such arms, each of said pins being provided at its end with a conical bearing face, and means for engaging the pins and holding the said conical bearing faces in rolling driving engagement.

2. The combination with two pairs of arms, an inwardly projecting pin integrally carried by each arm, said pins being provided with enlarged conical end faces, the conical faces of the pins on one pair of arms being in rolling driving engagement with the conical faces on the pins on the other pair of arms, and means for holding the said faces in interengagement.

3. The combination with two pairs of arms, an inwardly projecting pin carried by each arm, said pins being provided with conical faces, the conical faces of the pins on one pair of arms being in rolling driving engagement with the conical faces on the pins on the other pair of arms, and means for engaging the pins and holding the said faces in rolling driving engagement.

4. In a universal joint, the combination of two members each provided with a pair of inwardly directed pins, the pins of one member being constructed and located for rolling driving engagement with the pins of the other member, and means for holding said pins in driving engagement.

5. In a universal joint, the combination of two members each provided with a pair of inwardly directed pins integral therewith, the pins of one member being constructed and located for rolling driving engagement with the pins of the other member, and means for holding said pins in driving engagement.

6. In a universal joint, the combination with a coupling member made of a pair of members, and means for holding adjacent faces of these members together, the meeting face of each member being chambered and the walls thereof having four half cylindrical recesses or bearings extending outwardly from such chamber, the half recesses in the mating blocks uniting to form bearings, a pair of members each carrying two inwardly directed pins for seating in said recesses or bearings and enlarged heads on the pins for occupying said chamber.

7. In a universal joint, the combination with a pair of members each provided with a pair of arms, each arm having integral with it an inwardly projecting pin and integral with the pin a head having an inwardly directed conical face and back of such face and outwardly thereof a shoulder disposed generally transversely of the pin, and a connecting block for said pins and heads made up of two members, and means for holding adjacent faces of these members together, one face of each member being chambered out for the partial reception of all the heads and also provided with a series of half bearings for the pins for holding the heads in driving engagement and for resisting the outward movement of the arms when the members are under load.

8. In a universal joint, the combination with a pair of members each provided with a pair of arms, each arm having integral with it an inwardly projecting pin and integral with the pin a head having a shoulder disposed generally transversely of the pin, and a connecting block for said pins and heads made up of two members, and means for holding adjacent faces of these members together, one face of each block being chambered out for the partial reception of all the heads and also provided with a series of half bearings for the pins for holding the heads in driving engagement and for engaging the shoulder and resisting the outward movement of the arms when the members are under load.

9. In a universal joint, the combination with a pair of members each provided with a pair of arms, each arm having integral with it an inwardly projecting pin and integral with the pin a head having a shoulder disposed generally transversely of the pin, and means for engaging the shoulder and resisting the outward movement of the arms when the members are under load.

CHARLES L. CUMMINGS.

Witnesses:
HARRY A. REYBERT,
CHAS. LYON RUSSELL.